United States Patent [19]
Gall

[11] 3,730,271
[45] May 1, 1973

[54] METHOD OF SELECTIVELY PLUGGING A FORMATION WITH A POLYMERIC ELASTOMER LATEX-BRINE MIXTURE

[75] Inventor: James W. Gall, Bartlesville, Okla.

[73] Assignee: Phillips Petroleum Company, Bartlesville, Okla.

[22] Filed: Nov. 19, 1971

[21] Appl. No.: 200,570

Related U.S. Application Data

[63] Continuation-in-part of Ser. No. 111,150, Jan. 29, 1971, abandoned.

[52] U.S. Cl..................... 166/294, 61/36 R, 166/295
[51] Int. Cl.......................... E21b 33/138, E02d 3/14
[58] Field of Search..................... 166/295, 294, 292; 61/36 R

[56] References Cited

UNITED STATES PATENTS

| | | | |
|---|---|---|---|
| 2,121,036 | 6/1938 | Irons | 61/36 R |
| 3,123,158 | 3/1964 | Gallus | 166/295 X |
| 3,251,414 | 5/1966 | Willman | 166/295 |
| 3,312,296 | 4/1967 | Paramore et al. | 166/294 X |
| 3,326,287 | 6/1967 | Corrin | 166/273 |
| 3,379,253 | 4/1968 | Chism | 166/295 |
| 3,443,637 | 5/1969 | Sparlin et al. | 166/295 |
| 3,443,640 | 5/1969 | Klein | 166/294 |
| 3,483,927 | 12/1969 | Nimerick et al. | 166/294 |
| 3,503,774 | 3/1970 | Weymouth | 61/36 R |
| 3,643,444 | 2/1972 | Hodgson | 61/36 R |

Primary Examiner—Stephen J. Novosad
Attorney—Young and Quigg

[57] ABSTRACT

A method for selectively plugging a soil or a first interval of a porous subterranean formation and controlling the occurrence of said plugging by injecting into the formation a mixture containing brine, a volume of surfactant, a volume of sodium hypochlorite and a polymeric elastomer latex having a definite particle size.

10 Claims, No Drawings

METHOD OF SELECTIVELY PLUGGING A FORMATION WITH A POLYMERIC ELASTOMER LATEX-BRINE MIXTURE

This application is a continuation-in-part of my application Ser. No. 111,150, filed Jan. 29, 1971, now abandoned.

This invention relates generally to a method for reducing the permeability of a soil or porous underground stratum by forming deposits or precipitates in the pore spaces of such a formation, and more particularly, to an improved method of selectively reducing the permeability of an underground formation in such a manner as to prevent or reduce the flow of fluids through the more permeable zones thereof without substantially reducing the permeability of the less permeable zones. The selective plugging agents of the invention are polymeric elastomer latices or dispersions having a limited particle size distribution and a critical, preselected particle diameter.

In a preferred application of the method, selective plugging is employed to control the injectivity profile of a permeable subterranean formation surrounding a wellbore, for example, an input well of a waterflood project in the secondary recovery of petroleum. Typically, permeabilities and pore diameters through an oil-bearing reservoir section vary greatly with depth. A 10-fold or even a 100-fold variation in permeability is common. When flood water or other displacing medium is injected into such a reservoir the highly permeable zones or streaks have a natural tendency to accept substantially the entire volume of injection flow, to the substantial exclusion of the less permeable zones. The uneven flow pattern, if uncorrected, is obviously a great detriment to the operation and can lead to it complete failure.

The problem of uneven flow also arises in a pattern waterflood where the reservoir is composed of a plurality of non-communicating layers. The flood water preferentially fingers through the more permeable layers, causing a premature breakthrough of water at the producing wells. This situation can also be corrected by selectively plugging off the more permeable layers, by injecting a suitable latex at either the injection wells or the producing wells.

Another application of the invention lies in facilitating the completion or stimulation of a production well. Increased fluid recovery from subterranean reservoirs can be effected by a number or techniques, such as acidizing or hydraulic fracturing, which enhance the efficiency of reservoir drainage. When employing these techniques, it is desirable to take preliminary steps in treating formations having widely differing permeability to ensure that most of the treating fluid is injected into the less permeable zones or streaks, while little or no treating fluid is introduced into the more permeable streaks. This can be accomplished by selectively plugging the more permeable zones in accordance with the present invention.

It is equally important in many completed wells to selectively plug off a water-bearing zone in order to permit the recovery of produced oil or gas relatively free of water. If the water-producing zone is relatively more porous than the oil or gas producing zone, it may be sealed off in accordance with the method of the present invention. An example of such water production involves the presence of a water-bearing formation immediately below the oil-producing zone. As oil is withdrawn, water from the lower formation tends to rise in the vicinity of the wellbore, to the level of the producing string. This condition, known as "coning," is frequently severe and has forced the abandonment of many wells.

It will be readily appreciated that in addition to the above applications the method of the present invention is useful whenever it is desirable to selectively plug a highly permeable zone of a subterranean reservoir without substantially reducing the permeability of adjacent, less permeable zones.

It has now been found that the particle diameter of a polymeric elastomer latex is a factor in determining whether or not a given latex is capable of invading a porous earth formation. A latex of large particle diameter will not invade sandstones, for example, even in the absence of coagulation at the surface of the rock. Small particle diameter latices do, however, invade the porous formation. Thus it is possible to select a critical particle diameter for the elastomeric solids in a latex, that will either permit invasion or that will result in no invasion. Moreover, the critical selection of particle diameter can be made as a function of formation porosity and permeability, which reflects the effective pore diameter of the rock.

The selective plugging agents of the present invention are oil-resistant polymeric elastomer latices, dispersions or suspensions. These materials are aqueous dispersions of polymeric elastomers, including natural and synthetic rubber latices, both virgin and reclaimed. Mixtures of natural and synthetic latices are also useful. Preferred latices are derived from synthetic elastomers prepared by the polymerization of olefinically unsaturated hydrocarbons, or by the copolymerization of such hydrocarbons with other olefinically unsaturated monomers. The olefinically unsaturated hydrocarbons include olefins such as isobutylene and the pentylenes; diolefins such as butadiene, isoprene, piperylene, dimethyl butadiene and 2-methyl pentadiene; vinyl aromatics such as styrene, methyl styrene and vinyl toluene. Mixtures of two or more of such hydrocarbons have also been found suitable. Olefinically unsaturated monomers which may be copolymerized with the hydrocarbons include halogenated olefinically unsaturated compounds such as vinyl chloride, allyl chloride and chloroprene, unsaturated esters such as vinyl acetate, allyl propionate, methyl methacrylate, ethyl acrylate, methyl fumarate, ethyl maleate and propyl itaconate. Unsaturated nitriles such as acrylonitrile, methacrylonitrile, ethyl acrylonitrile and chloroacrylonitrile. Also included are unsaturated ketones such as methyl vinyl ketones, cyclic vinyl compounds such as vinyl pyridine, and mixtures thereof. It will be recognized that not all of these elastomers are equally effective for use in preparing a selective plugging material.

Specific examples of elastomers prepared from the foregoing monomers, which are suitable in the form of latices for use as selective plugging agents include polyisobutylene, polystyrene, polybutadiene, polyisoprene, butadieneisoprene copolymers, isoprene-isobutylene copolymers, isobutylene-styrene copolymers, piperylene-vinyl acetate copolymers, butadiene-styrene-vinyl chloride copolymers, butadiene-acrylonitrile copolymers, butadiene-methacrylonitrile copolymers and isoprene-chloroprene-vinyl acetate copolymers.

Latices containing the foregoing elastomers may be prepared by the emulsion polymerization of suitable monomers or by the emulsification of organic solution of dry elastomers with water or other liquid followed by removal of the organic solvent. The method utilized will depend primarily on the elastomer used. Many conjugated diolefin polymers and copolymers of conjugated diolefins with monomers containing a vinylidene linkage, polybutadiene and copolymers of 1,3-butadiene with styrene, acrylonitrile or vinyl chloride, for example, can readily be prepared by emulsion polymerization and recovery in the latex form. Other elastomers, such as styrene-isobutylene and isobutylene-isoprene copolymers are best prepared by bulk or solution polymerization in processes which do not result in the formation of latices. Elastomers prepared in the latter manner must subsequently be emulsified with the aid of a solvent to produce latices. Processes for preparing latices by both methods are widely known in the art.

Typically, latices of the invention are characterized by elastomer particle sizes ranging between about 0.05 and about 2 microns in diameter. Present technology permits the manufacture of synthetic latices having a substantially more uniform distribution of particle sizes than is characteristic of natural rubber latex. Commercial materials are commonly available with particle sizes under 0.1 micron in diameter, prepared by emulsion polymerization techniques. On the other hand, dispersions of reclaim rubber can be made with particles larger than 2 microns in diameter.

Specific examples of suitable commercial latices are "Naugatex 2000," "Naugatex 2002," and "Naugatex 2113." "Naugatex" is a registered trademark of the Naugatuck Chemical Division of the United States Rubber Company, Naugatuck, Connecticut. These latices are prepared by emulsion copolymerization of butadiene with styrene, and contain 46 percent, 46 percent and 44 percent, respectively, of bound styrene. The reported particle size of the above latices is 0.1 micron, 0.12 micron, and 0.08 micron, respectively.

Other suitable examples are "Nitrex 2616" and "Nitrex 2625," also available from the Naugatuck Chemical Division of U. S. Rubber. The first of these is a butadiene-acrylonitrile copolymer having 45 percent bound acrylonitrile and a particle size of 0.07 micron. The other is a butadiene-styrene-acrylonitrile terpolymer having 29 percent bound styrene, 33 percent bound acrylonitrile, and a particle size of 0.2 micron.

Still another example of a suitable commercial latex is "Enjay Butyl Latex 80-21" which is an emulsion of butyl rubber in water, containing about 55 percent solids, marketed by Enjay Company, Inc., New York 19, N. Y. The average particle diameter of the dispersed phase is 0.5 micron.

The stated particle sizes of the various commercially available latices are approximate average particle diameters. The distribution or range of particle sizes found in most latices is relatively broad, while in others the particles have a substantially uniform diameter. It may appear reasonable at first to expect that the smallest particles of a given latex would invade and seal all zones having an effective pore diameter large enough to permit entry of the smallest particles, even though the majority of elastomer particles in the given latex are too large to invade. Actually, however, no substantial invasion occurs under such circumstances. It appears that the larger particles quickly block the potential entry of the smaller particles thereby preventing substantial invasion by even the smaller ones.

Moreover, it has been found that even when the largest particles of a latex are somewhat smaller than the calculated average pore diameter of a permeable stratum, it is no guarantee that substantial invasion will occur. Nevertheless, latex particle diameter is a factor in determining whether a certain latex will or will not invade a certain porous rock. Specifically, the largest particle diameter of a latex should be much smaller than the constriction in the pores of a given permeable zone, if significant invasion is to be obtained.

In view of the fact that present technology does not permit a detailed description of the flow channels in a porous rock nor does it permit a precise, statistically sound measurement of latex particle diameter, the particular latex most suited for a given rock is best determined by laboratory tests, as described later, using the principles set out above as a guide.

The character of a porous subterranean formation amenable to treatment in accordance with the present invention must include at least one relatively more permeable interval and at least one relatively less permeable interval. Best results are obtained when the permeability of the less permeable interval or intervals differs from the permeability of the relatively more permeable interval or intervals by a factor of at least two.

A latex having a relatively narrow range or distribution of elastomer particle sizes, the average particle diameter being small enough to permit substantial invasion of the more permeable zone or zones, and preferably large enough to prevent substantial invasion of the less permeable zone or zones is introduced into the borehole. Once it has penetrated a preferred distance in the more permeable zone, it is coagulated.

Brine is utilized for introducing the latex into the formation. In order to prevent premature coagulation of the latex when said latex is in contact with brine that is naturally occurring within the formation or the brine that is utilized as a carrier fluid, a surfactant must be added to the brine-latex mixture.

Examples of the surfactants that can be used to prevent latex from coagulating prematurely in the method of this invention are:

Nonylphenoxypoly(ethyleneoxy)ethanol retailed under the brand name "Igepal CO–530, CO–610, CO–730, CO–880, or CO–990," and manufactured by the GAF Corporation, 140 West 51st, N.Y., N.Y.

Octylphenoxypolethyoxyethanol retailed under the brand name "Triton X–100."

Alkylaryl polyether alcohol retailed under the brand name "Triton X–120."

Octylphenoxypolyethoxyethanol retailed under the brand name "Triton X–305" manufactured by the Rohm and Haas Company, Independence Mall West, Philadelphia, Pennsylvania.

Nonylphenylpolyethyleneglycol ether retailed under the brand names "NP–35" or "NP–40" manufactured by Union Carbide Corporation, 270 Park Avenue, New York, N.Y.

After the latex material is injected into the subterranean formation and positioned a desirable location in the more permeable zone relative to the wellbore, it is necessary for the latex to coagulate to seal the pore spaces of the formation and thereby selectively plug said formation. It has been discovered that if a volume of sodium hypochlorite in the range of about 0.08–1.75 lbs. per barrel of brine, a volume of the surfactant described above in the range of about 0.08–0.75 lbs. per barrel of brine, and the polymeric elastomer latex solids in the range of about 0.75–3.5 lbs. per barrel of brine, are mixed together said resultant mixture can be injected into the formation and the coagulation of the latex can be controlled to occur 3–5 days after the injection thereof.

Where the method of this invention is utilized for treating and sealing soils the upper limit of the sodium hypochlorite should be 70 lbs. per barrel of brine, the upper limit of the surfactant should be 35 lbs. per barrel of brine and the upper limit of the latex should be 15 lbs. per barrel of brine. At concentrations above these upper limits, coagulation time will be excessive.

Spacing of the mixture from the wellbore can be accomplished by injecting a volume of brine through the wellbore and into the formation after injecting the mixture. The preferred spacing from the wellbore can be determined by one skilled in the art and the amount of brine to be injected following the mixture easily calculated. The well is thereafter preferably closed for maintaining said mixture at the desired location for said preselected period of time necessary for coagulation of the latex in situ.

It may then be desirable to backflow the well in order to remove the excess latex which adheres to the less permeable intervals without invading. The backflow does not remove the coagulated latex from the more permeable, invaded zone or zones. The latex material entering the less permeable zones will not penetrate substantial distances from the well bore and said material generally will backflow into the more permeable zone when the well is closed in. If some plugging occurs in the low permeability zones, remedial treatment as known in the art can open this low volume plugging. In accordance with one embodiment of the invention, a core sample taken from a zone of relatively high permeability is subjected to a series of invasion tests, first with a latex having a particle diameter too large to invade the core, and then with latices having successively smaller particles, until a latex is selected having particles of a diameter just small enough in invade sufficiently for the purpose of effectively plugging or sealing the formation. The selected latex is then injected into the wellbore, whereupon it will invade and plug the zone from which the core was taken, including all other zones of equal or greater permeability. Zones of significantly smaller effective pore size will not be appreciably invaded. Excess latex can easily be removed from the face of the non-invaded zones by temporarily backflowing the well, by resuming normal flow in the case of a production well, or by remedial work.

In the event that the permeability of the more permeable zone or zones exceeds the permeability of the less permeable zone or zones by a relatively great margin, for example by a factor of about 10, the selection of a suitable latex for selectively plugging the more permeable zone or zones need not be limited to those latices having a substantially uniform particle diameter. A relatively broad range of particle diameters can be tolerated, without appreciable loss of selectivity.

On the other hand, the selection of a latex having a relatively uniform particle size is preferred when treating a well wherein the permeabilities of the different zones are not so widely separated. In treating such a reservoir, some undesired, shallow plugging of the relatively less permeable zones may occur. But the treatment in such cases is by no means a failure. The zones which become inadvertently plugged can be reopened by enlarging the affected interval of the borehole and thereby exposing a fresh surface, beyond the extent to which the undesired invasion has occurred. Enlargement of the borehole can be accomplished by a conventional drilling technique known as underreaming. The more permeable zones are not reopened by such enlargement because of the greater extent of invasion.

The following are example mixtures for delaying the coagulation of the latex for resultant selective plugging of subterranean formations and soils by the method of this invention.

Example I

| Porous Media | Sand Pack No. 1 | Sand Pack No. 2 | Burbank Core |
|---|---|---|---|
| $k_0$ (md) | 1206 | 1416 | 845 |
| $k_1$ (md) | 344 | 398 | 152 |
| $k_2$ (md) | 81 | 142 | 64 |
| Time Delay at 120°F (days) | 3 | 2 | 5 |
| Treatment Solution: Concentrations in 5% Brine | | | |
| Latex Solids (ppm) | 10,000 | 10,000 | 5000 |
| CO-730 (ppm) | 3000 | 2500 | 2500 |
| NaOCl (ppm) | 5000 | 5000 | 5000 |
| Viscosity (cp) | | | |

$k_0$ Original brine permeability
$k_1$ Brine permeability at the end of injection of the treatment solution
$k_2$ Brine permeability after delayed coagulation of the treatment solution by the hypochlorite.

Permeability decrease by delayed coagulation of rubber latex with hypochlorite can also be used for sealing soils. The delayed coagulation would provide time for the treating fluid to penetrate the soil to the desired depth before the seal is formed. The delay can be controlled by varying the relative amounts of latex, surfactant or hypochlorite. The latex is stabilized in brine with surfactant which is then destroyed after a given time by the hypochlorite.

The following are examples of the delays which can be obtained with this system.

| Latex Solids ppm | Surfactant Igepal CO-610 ppm | Sodium Hypochlorite ppm | Approximate time to Coagulation at 77°F | at 120°F |
|---|---|---|---|---|
| 10,000 | 1,000 | 5,000 | 2 days | 3.5 hours |
| 10,000 | 1,000 | 2,000 | 3 days | 7 hours |
| 10,000 | 1,000 | 1,500 | 6 days | 1 day |
| 10,000 | 1,000 | 1,000 | 9 days | 3 days |
| 10,000 | 2,500 | 5,000 | | 1 day |
| 10,000 | 3,500 | 5,000 | | 7 days |

The following are example mixtures for delaying the coagulation of the latex for the resultant decrease in the permeability.

| Porus Media | Bellamy Sandstone | Boise Sandstone | Sand Pack |
|---|---|---|---|
| $k_0$ (md) | 1866 | 1048 | 1083 |
| $k_1$ (md) | 202 | 381 | 409 |
| $k_2$ (md) | 112 | 37 | 142 |
| Time Delay - at 120°F | 1 day | 2 days | 3 days |
| Concentrations (ppm) | | | |
| Latex | 5000 | 5000 | 10,000 |
| Surfactant | 750(CO-610) | 1500(CO-730) | 2500 (CO-730) |
| NaOCl | 1500 | 3000 | 5000 |

$k_0$ — original water permeability
$k_1$ — water permeability at the end of the injection of the treatment solution
$k_2$ — water permeability after delayed coagulation of the treatment solution by the hypochlorite.

By the addition of sodium hypochlorite to the latex dispersion, the depth of penetration into the formation where coagulation occurs and therefore where the plug is formed can be controlled. Thus, for a deeper plug, the time to coagulation can be lengthened by decreasing the sodium hypochlorite concentration thereby permitting injection of the dispersion into the formation to a location spaced further from the well bore.

Generally, an increase in the concentration of sodium hypochlorite utilized decreases the time after injection at which coagulation of the material occurs. However, the coagulation time is also affected by the reservoir temperature, latex concentration, and surfactant concentration. One skilled in the art can thus design a specific treatment for a certain reservoir temperature and the reservoir portion desired restricted based on conventional data obtained from temperature and formation logs and a knowledge of fluid and reservoir mechanics.

The invention can be used for plugging water injection wells, producing wells for water shut off or lowering of the gas-to-oil ratio or for other purposes known in the art. When associated with selectively plugging producing wells, after the coagulation of the latex in situ, the well can then be produced. Since the first interval is plugged, production will substantially be limited to fluids entering the wellbore from the second or other intervals of the subterranean formation.

Other modifications and alterations of this invention will become apparent to those skilled in the art from the foregoing discussion and it should be understood that this invention is not to be unduly limited thereto.

What is claimed is:

1. A method for selectively plugging a first interval to the substantial exclusion of a second interval of a porous subterranean formation penetrated by a wellbore with said first interval of the formation having a permeability greater than said second interval, comprising:
   injecting through said wellbore and into said formation a mixture containing brine, surfactant in the range of about 0.08–0.75 lbs. per barrel of brine, sodium hypochlorite in the range of about 0.08–1.75 lbs. per barrel of brine, and a polymeric elastomer latex having an average particle size sufficiently small to permit substantial invasion of said first interval by said latex and being in a volume in the range of about 0.75–3.5 lbs. of latex solids per barrel of brine and said sodium hypochlorite being in an amount sufficient for delaying coagulation of the mixture during passage of said mixture through the formation to the desired location.

2. A method, as set forth in claim 1, wherein the surfactant is selected from a group consisting of nonylphenoxypoly(ethyleneoxy)ethanol, octylphenoxypolethoxy)ethanol, alkylaryl polyether alcohol, octylphenoxypolyethoxyethanol, and nonylphenylpolyethyleneglycol ether.

3. A method, as set forth in claim 1, including injecting a volume of brine through the wellbore and into the formation after injecting the mixture for moving said mixture through the formation a preselected distance from the wellbore and closing the well for maintaining said mixture at the desired location for said preselected period of time.

4. A method, as set forth in claim 1, wherein the latex particles have a size in the range of about 0.05 to about 2.0 microns in diameter.

5. A method for decreasing water-to-oil ratio produced from a porous subterranean formation penetrated by a wellbore, wherein the permeability of a water-producing first interval of said formation is greater than the permeability of an oil-producing second interval of the formation, by selectively plugging said first interval to the substantial exclusion of said second interval, comprising:
   injecting through said wellbore and into said formation a mixture containing brine, surfactant in the range of about 0.08–0.75 lbs. per barrel of brine, hypochlorite in the range of about 0.08–1.75 lbs. per barrel of brine, and a polymeric elastomer latex having an average particle size sufficiently small to permit substantial invasion of said first material by said latex but sufficiently large to prevent substantial invasion of said second material and in a volume in the range of about 0.75–3.5 lbs. of latex solids per barrel of brine, said sodium hypochlorite being in an amount sufficient for delaying coagulation of the mixture during passage of said mixture through the formation to the desired location;
   maintaining the mixture within the formation for said time sufficient; and thereafter
   producing fluids entering said wellbore.

6. A method, as set forth in claim 5, wherein the surfactant is selected from a group consisting of nonylphenoxypoly(ethyleneoxy)ethanol, octylphenoxypolethoxy)ethanol, alkylaryl polyether alcohol, octylphenoxypolyethoxyethanol, and monylphenylpolyethyleneglycol ether.

7. A method, as set forth in claim 5, including injecting a volume of brine through the wellbore and into the formation after injecting the mixture for moving said mixture through the formation a preselected distance from the wellbore, enclosing the well for maintaining said mixture at the desired location for said preselected period of time.

8. A method for sealing porous soil, comprising:
   pouring onto the soil a mixture containing brine, surfactant in the range of about 0.08–35 pounds per barrel of brine, sodium hypochlorite in the range of about 0.08–70 pounds per barrel of brine and a polymeric elastomer latex having an average particle size sufficiently small to permit substantial invasion of said soil by said latex and being in a volume in the range of about 0.75–15 pounds of latex solids per barrel of brine and said sodium hypochlorite being in an amount sufficient for delaying coagulation of the mixture during passage of said mixture through the soil to a desired location.

9. A method, as set forth in claim 8, wherein the surfactant is selected from a group consisting of nonylphenoxypoly(ethyleneoxy)ethanol, octylphenoxypolethoxy)ethanol, alkylaryl polyether alcohol, octylphenoxypolyethoxyethanol, and nonylphenylpolyethyleneglycol ether.

10. A method, as set forth in claim 8, wherein the latex particles have a size in the range of about 0.05 to about 2.0 microns in diameter.

* * * * *